A. C. FAST.
VEGETABLE PEELER.
APPLICATION FILED SEPT. 7, 1910. RENEWED JULY 6, 1911.
1,012,129. Patented Dec. 19, 1911.
2 SHEETS—SHEET 2.
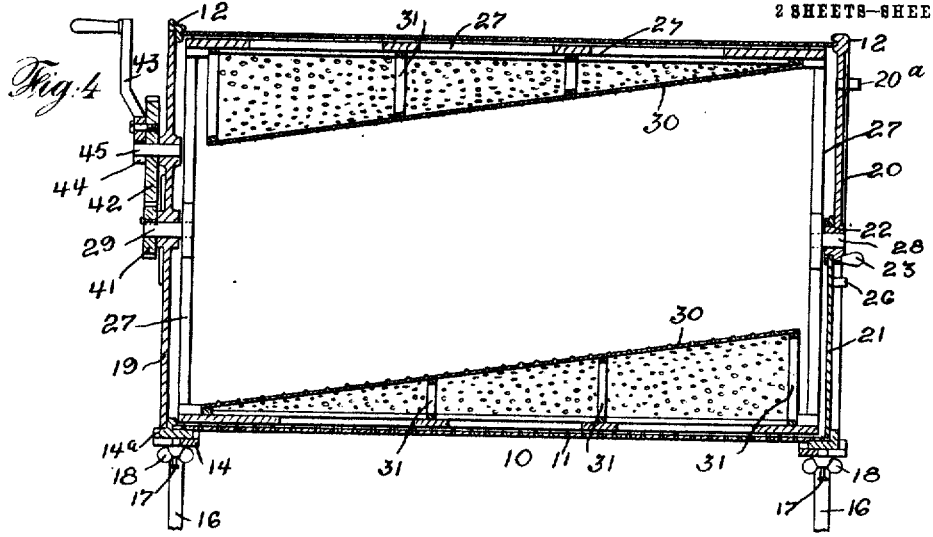
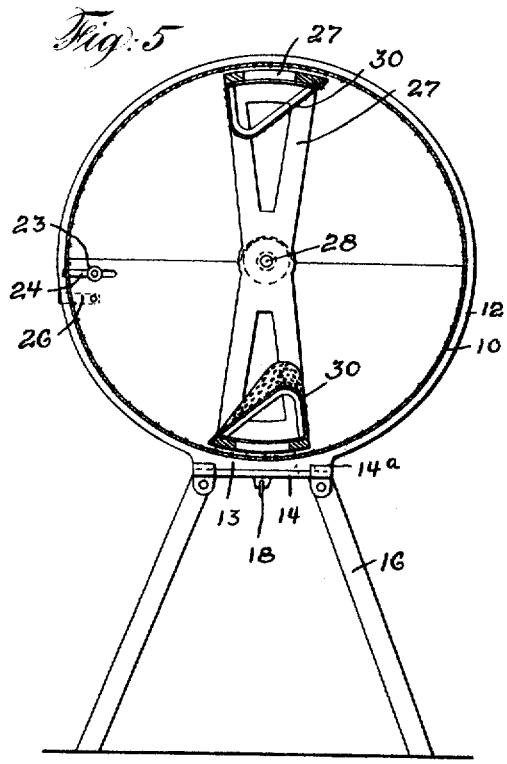
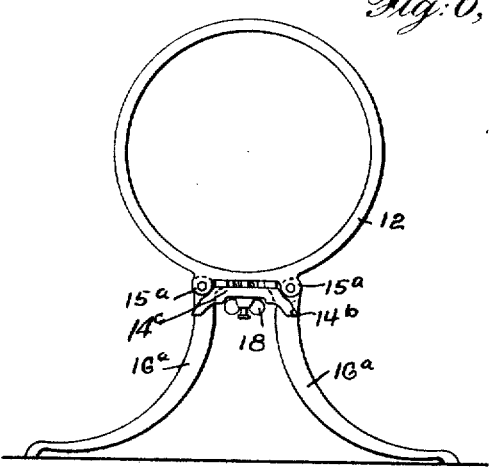
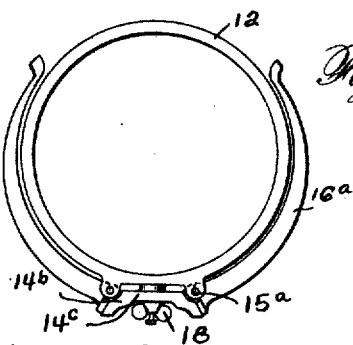
Witnesses:
Max B. A. Doring
Arthur E. Dannell
August C. Fast, Inventor
By his Attorney,
W. B. Hutchinson.

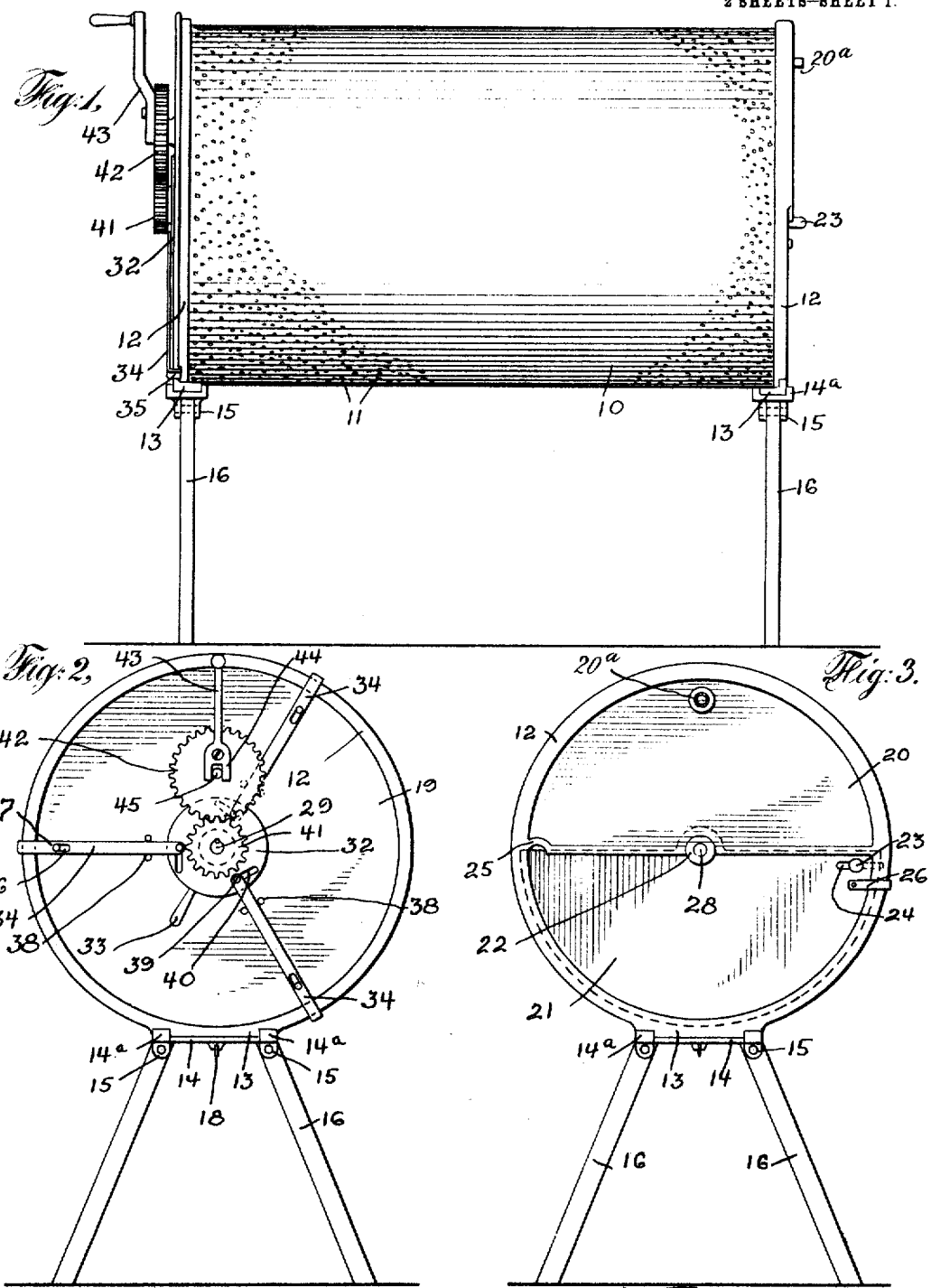

UNITED STATES PATENT OFFICE.

AUGUST C. FAST, OF EAST ORANGE, NEW JERSEY.

VEGETABLE-PEELER.

1,012,129.  Specification of Letters Patent.  Patented Dec. 19, 1911.

Application filed September 7, 1910, Serial No. 580,885. Renewed July 6, 1911. Serial No. 637,004.

*To all whom it may concern:*

Be it known that I, AUGUST C. FAST, of East Orange, Essex county, New Jersey, have invented a new and useful Improvement in Vegetable-Peelers, of which the following is a full, clear, and exact description.

My invention relates to improvements in vegetable peelers and is especially adapted for use in peeling potatoes, though it can be used for peeling any ordinary variety of vegetables.

The object of my invention is to produce a machine in which a relatively large quantity of vegetables can be simultaneously placed and then nicely peeled by rotating the receptacle in which the vegetables are located. In carrying out this idea I use a stationary drum which has a grater inner surface and which contains the vegetables to be peeled. Within the drum I arrange an agitator which has raised and inclined members with grater surfaces, which members engage the vegetables, rotate them and tumble them about, and cause the skins to be peeled off by the grater surfaces of the agitator members and the inner part of the drum. If the agitator simply moved the potatoes about and in contact with the drum, the result would be unsatisfactory, and especially so as the vegetables are apt to collect at one end of the apparatus, but to obviate this arrangement I provide my roughened or grater surfaced agitator members with convex and somewhat triangularly shaped surfaces, which have a tendency to forcibly engage the vegetables and tumble them nicely, and further I incline opposed members in opposite directions so that by this arrangement the vegetables are moved from one end of the machine to the other and the mass maintains an essentially central position.

A further object of my invention is to produce an apparatus of this character which is simple and easy to operate, which is a knock-down affair so that it can be readily packed for shipment or set up for use, and which is readily detachable and openable both for the purposes of cleaning and for inserting and removing the vegetables to be peeled.

Reference is to be had to the accompanying drawings forming a part of this specification, in which similar reference characters indicate corresponding parts in all the views.

Figure 1 is a side elevation of the machine embodying my invention. Fig. 2 is a front end view thereof. Fig. 3 is a rear end view thereof. Fig. 4 is a longitudinal section of the drum and accessory parts. Fig. 5 is a cross section through the drum, and Figs. 6 and 7 are details of a slightly modified form of supporting means for the drum.

The machine is provided with a drum 10 which is preferably of sheet metal, and this has numerous inward punctures 11 to produce a grater surface similar to that of the ordinary nutmeg grater, although this roughened surface can be otherwise produced without affecting the invention. The drum at its end is provided with stiffening rims 12 and these are thickened at the bottom as shown at 13 so as to rest on the base plate 14, this latter being preferably provided with up-turned lugs 14ᵃ to grip the sides of the thickened or foot portion 13, and with depending ears 15 between which are pivoted the legs 16. The upper ends of the legs when spread out for use abut with the plate 14 and form a secure support for the structure. The drum can be fastened to the supporting legs in any convenient way. As shown each foot piece 13 has a bolt 17 extending through the plate 14 and this is provided with a wing or thumb nut 18 by which the parts may be clamped together. This forms a very convenient and secure support for the apparatus, but obviously other means may be employed for supporting the drum, or it can be used without any leg supports.

I have shown another form of support in Figs. 6 and 7. Here the rims 12 have depending ears 15ᵃ between which are pivoted the curved and spreading legs 16ᵃ. A plate 14ᶜ as before described as plate 14 is arranged below the rim 12, and this has spreading lugs 14ᵇ serving to brace the legs 16ᵃ and hold them either opened or closed. For instance the nut 18 may be loosened, the plate 14ᶜ dropped, and the legs 16ᵃ turned up around the rim 12 as in Fig. 7, and the nut can then be tightened so that the parts 14ᵇ will engage the ends of the legs and hold them in closed position as described. The most essential part of the machine, however, is the construction of the drum and its internal and end mechanism.

One end of the drum is closed by a disk 19 which is easily removable, and the other end of the drum is partly closed by the end plate 20, while it is provided with a rotating or oscillating slide 21 to permit the vegetables to be readily inserted or removed. This slide which serves the purpose of a door, is journaled on the hub 22 of the plate 20, and it is provided preferably at one edge with a handle 23 by which it may be turned, which handle is movable in a generally radial direction in the slot 24. When the door or slide is to be opened, the handle is pushed in and then moved around circularly until it comes to rest in the socket 25 (see Fig. 3). Unless the handle 23 is pushed inward it is prevented from turning by the stop 26 which is attached to the rim 12.

Within the roughened drum 10 is a rotating spider frame 27 which is of skeleton structure but of the general shape of the drum, and turns snugly within it but out of contact therewith, this frame having journals 28 and 29, the former turning in the hub 22 and the latter in the end of the disk or plate 19. The rotating skeleton or spider frame 27 carries agitators 30 which are preferably of sheet metal, and are pierced by numerous perforations so as to produce grater surfaces on their inner portions, and each member 30 is preferably of a generally triangular shape in cross section, as shown best in Fig. 5, while it is inclined from one end to the other as shown clearly in Fig. 4. It will be noticed by reference to Fig. 4 that the thicker end of one of the members 30 is at one end of the apparatus, while the thicker end of the opposite member is at the other end of the apparatus. By this arrangement the vegetables when the agitator is rotated, are moved backward and forward from one end of the apparatus to the other while a generally central position is maintained by the mass, and they are prevented from accumulating at one end only of the structure. I have found, too, that the shape shown works best in tumbling the vegetables and bringing them into contact with the grater surface of the drum 10, so as to detach the peeling. The members 30 are braced by internal ribs 31, and obviously any desired number of them can be used, but I find in practice that two work satisfactorily.

It is desirable to have one end of the drum removable so that the apparatus can be easily taken apart, and I have shown the disk or plate 19 detachable. Means must be provided for fastening it rigidly to the drum, however, and I have shown a convenient means in Fig. 2. Here a disk 32 is pivoted centrally on the plate 19, and is provided with a handle 33 by which it may be turned. Radiating from the disk are arms 34, the outer ends of which are hook shaped as shown at 35 in Fig. 1, so as to engage the outer edge of the rim 12. The arms are preferably slotted as shown at 36 to receive guide pins 37 on the plate 19, and they also preferably slide between guide pins 38 on said plate. The inner ends of the arms 34 have pins 39 which enter slots 40, in the disk 32. It will be seen, therefore, that by turning the disk 32 in one direction, the cam slots acting on the pins 39 will draw the arms 34 firmly inward so as to fasten the disk or plate 19 securely to the rim 12, while by the opposite movement the hooks 25 are forced out of engagement with the rim and the plate 19, and the whole inner arrangement, that is the agitator, together with the gearing on the plate, can be easily lifted off.

Any suitable means can be used for rotating the agitator, but I prefer the means illustrated, in which a gear 41 is keyed to the shaft 29 and meshes with a gear 42 which is pivoted on the shaft 45. A crank handle 43 is used to turn the gear 42, this handle being secured to the gear 42, and being preferably provided with a forked end 44 which straddles the journal 45 of the gear 42. It will be observed that by rotating the handle 43 the motion will be transmitted to the agitator comprising the frame 27 and the members 30, so that the potatoes or other vegetables in the drum will be turned and tumbled, and the grater surfaces on the parts 30 and 10 caused to come in contact with all the parts of the said vegetables so that the skins will be very quickly removed.

It will be noticed that the gearing above described is on the removable end of the drum so that when the end is taken off the gearing and handle are also removed. This is an important matter as it is essential to keep the machine clean, and it makes it very easy to clean the end and to remove the gearing while the peeler is being filled or the material removed or the gearing and drum cleaned. It will also be noticed that the arrangement described permits the use of a drum and agitator in which there is no center shaft. This is essential because where the shaft is used, it has a tendency to clog the machine and prevent the vegetables from being properly turned and tumbled, and furthermore, where the vegetables are cooked and the shaft is used, the vegetables are badly broken by falling against the shaft.

In practice I find it much better to have the grater surfaces on the members 30, but I do not limit the invention to this arrangement, as any members which are of the shape referred to and arranged as above described will come within the scope of my invention.

In practice it is better to have water in the drum while it is being used, and to this end I provide a nipple 20ª in the upper end of the part 20 so that a water connection can be made with this and water permitted to run in while the machine is being operated.

I claim:—

1. A vegetable peeler comprising a drum having an internal roughened or grater surface, a rotatable agitator arranged within the drum and turning on a horizontal axis, the drum and agitator being arranged so as to leave the center space of the drum clear, and convex inclined members of opposite pitch carried by the agitator and extending longitudinally of the drum and turning near the surface of the drum.

2. A vegetable peeler comprising a drum having an internal roughened or grater surface, an agitator turning within the drum, said agitator having a horizontal axis, and the drum and agitator being arranged so as to leave a clear central space in the drum, and inclined members of opposite pitch carried by the agitator and extending longitudinally of the drum and provided with roughened inner surfaces.

3. A vegetable peeler comprising a drum having an internal roughened or grater surface, and an agitator turning on a horizontal axis within the drum, said agitator comprising a skeleton frame and raised and inclined members of opposite pitch carried by the frame and extending longitudinally of the drum and moving near the drum surface, the center portion of the drum being left clear.

4. A vegetable peeler comprising a horizontally arranged drum having an internal roughened surface and an agitator rotated within the drum, said agitator comprising a skeleton framework and longitudinally arranged members thereon turning near the drum surface, each member being convex in cross section with a roughened inner surface, said members being oppositely pitched and extending longitudinally of the drum, and the agitator and drum being constructed so as to leave the middle portion of the drum clear.

AUGUST C. FAST.

Witnesses:
WARREN B. HUTCHINSON,
ARTHUR G. DANNELL.